United States Patent [19]
Kanazawa et al.

[11] Patent Number: 5,072,297
[45] Date of Patent: Dec. 10, 1991

[54] METHOD AND SYSTEM FOR TRANSMITTING AND RECEIVING PCM AUDIO SIGNALS IN COMBINATION WITH A VIDEO SIGNAL

[75] Inventors: Masaru Kanazawa; Taiichiro Kurita; Kazuhiko Shibuya; Taiji Nishizawa; Yutaka Tanaka; Minoru Honda; Kazumasa Enami; Haruo Okuda; Hideki Suganami; Yoshiharu Hoshino; Toshiyuki Takegahara; Kaoru Watanabe, all of Tokyo, Japan

[73] Assignee: Nippon Hoso Kyokai, Tokyo, Japan

[21] Appl. No.: 499,874

[22] Filed: Mar. 27, 1990

[51] Int. Cl.$^5$ .......................................... H04N 7/093
[52] U.S. Cl. .................................... 358/143; 358/145
[58] Field of Search ................ 358/143, 144, 145, 198

[56] References Cited

U.S. PATENT DOCUMENTS

| | | | |
|---|---|---|---|
| 3,723,637 | 3/1973 | Fujio et al. | 358/145 |
| 3,902,007 | 8/1975 | Justice | 358/145 |
| 4,321,623 | 3/1982 | Rzeszewski | 358/145 |
| 4,333,108 | 6/1982 | Quan et al. | 358/145 |
| 4,442,461 | 4/1984 | Shirai et al. | 358/145 |
| 4,479,150 | 10/1984 | Ilmer et al. | 358/145 |

OTHER PUBLICATIONS

R. Futscher, Radio-Electronics p. 12 Jun. 1990.

Primary Examiner—John W. Shepperd
Attorney, Agent, or Firm—Rothwell, Figg, Ernst & Kurz

[57] ABSTRACT

A method and system for multiplexing additional audio information in the form of pulse code modulation (PCM) audio signals onto a television signal. The PCM audio signal is time multiplexed into scanning retrace intervals of the video signal. At a receiver, the bit error rate of the decoded PCM audio signal is compared with a threshold so as to switch the audio output from the PCM audio signal to a conventional FM demodulated audio signal when the bit error rate exceeds the predetermined threshold. In this way, the benefits of both PCM audio and FM audio can be obtained by utilizing the higher immunity of FM signals in low signal-to-noise ratio environments, while the high fidelity PCM audio signal is utilized when the signal-to-noise ratio environment is relatively high.

16 Claims, 12 Drawing Sheets

FIG. 12

METHOD AND SYSTEM FOR TRANSMITTING AND RECEIVING PCM AUDIO SIGNALS IN COMBINATION WITH A VIDEO SIGNAL

FIELD OF THE INVENTION

The present invention relates to a system and method for transmitting video and audio signals and more particularly to a system and method for transmitting not only video and audio signals of the standard television systems, for example, National Television Systems Committee (NTSC) system but also the same audio signal which is pulse code modulation (PCM) encoded and multiplexed into a scanning retrace interval of the video signal so that the audio signal of enhanced high fidelity may be transmitted and received over a transmission channel particularly when the signal-to-noise ratio of a transmission channel is adequate.

BACKGROUND OF THE INVENTION

Conventionally, television audio signals are transmitted by frequency modulating an audio carrier having a frequency within a transmission band of a broadcasting channel, wherein the modulated audio signal is transmitted along with a modulated video signal and is received and demodulated at a receiver. Such a system is used, for example, by the National Television Systems Committee (NTSC) system.

Also known is a system of high fidelity audio signal transmission which utilizes pulse code modulation (PCM) to encode an audio signal and time multiplexes the PCM audio signal within suitable intervals of a video signal, as disclosed for a high definition television system such as the so-called MUSE system disclosed in U.S. Pat. No. 4,745,459.

The FM system exhibits a high immunity to noise in transmission. However, the FM system is more prone to distortion in transmission than PCM, and thereby offers lower fidelity than the PCM system. While offering higher fidelity than conventional FM transmission, the PCM system deteriorates rapidly when the signal-to-noise ratio is low over a particular transmission channel.

SUMMARY OF THE INVENTION

The present invention is concerned with maintaining a high fidelity for a TV audio signal when the improved signal-to-noise ratio of a transmission medium.

While picture image quality of a video signal deteriorates only gradually with a reduction in signal-to-noise ratio, a PCM audio signal exhibits rapid deterioration when an error rate exceeds the correction capability of a correction code which is utilized in the encoding of the signal. Such an error rate may exceed the correction capability when the signal-to-noise ratio becomes low.

On the other hand, while an FM audio signal exhibits inferior fidelity with respect to a PCM audio signal, the FM audio signal is more immune to noise and thus does not degrade as rapidly upon the lowering of a signal-to-noise ratio.

A first object of the present invention is to provide a system and method for transmitting and receiving television audio signals, by pulse code modulation (PCM) encoding an input audio signal transmitted by the standard television system, for example, National Television Systems Committee (NTSC) system, time multiplexing the PCM audio signal into a scanning retrace interval of the video signal, transmitting such multiplexed audio signal together with the same audio signal of the standard television system, and at the receiving end, by using any one of the audio signals by switching according to a signal to noise ratio of a transmission channel or a bit error rate of a PCM audio signal so that a receiver of the standard television system receives the audio signal and also receives the PCM audio signal of enhanced high fidelity when the S/N ratio is adequate or the bit error rate is low with maintaining the compatibility with the standard systems.

A second object of the present invention is to provide a system and method for transmitting and receiving television audio signals, by superimposing a guard band pulse into a reference leading edge portion of a synchronizing signal, and multiplexing the PCM audio signal between the guard band pulse and a video signal so that effects exerted by the multiplexed PCM audio signal on the reference leading edge of the synchronizing waveform is reduced and a capacity for multiplexing the PCM audio signal is increased.

A third object of the present invention is to provide a system and method for transmitting and receiving television audio signals, by rapidly generating a clock signal having an accurate and stable frequency and phase adequate enough to decode the received PCM audio signal.

In particular, the present invention provides a method of transmitting and receiving television audio signals, comprising the steps of pulse code modulation encoding an input audio signal, frequency modulation encoding the input audio signal, time multiplexing the PCM encoded signal into a scanning retrace interval of an encoded video signal, modulating a video carrier with the time multiplexed video signal, adding the FM encoded audio signal to the modulated video signal to form a combined signal, transmitting the combined signal over a transmission medium, receiving the combined signal, demultiplexing the PCM encoded audio signal from the received combined signal, decoding the PCM encoded audio signal, demodulating the FM encoded audio signal, detecting a bit error rate in the PCM decoded signal, outputting the PCM decoded signal when the bit error rate is less than or equal to a predetermined threshold, and outputting the FM decoded signal when the bit error rate has exceeded the predetermined threshold.

The present invention also provides a system for encoding and/or decoding audio information in accordance with the method described above.

BRIEF DESCRIPTION OF THE DRAWINGS

The present invention will become more fully understood from the detailed description given hereinbelow in conjunction with the accompanying drawings which are presented for purposes of illustration only, and are not limitative of the present invention, and wherein.

DETAILED DESCRIPTION OF THE PREFERRED EMBODIMENTS

Figure 1A:
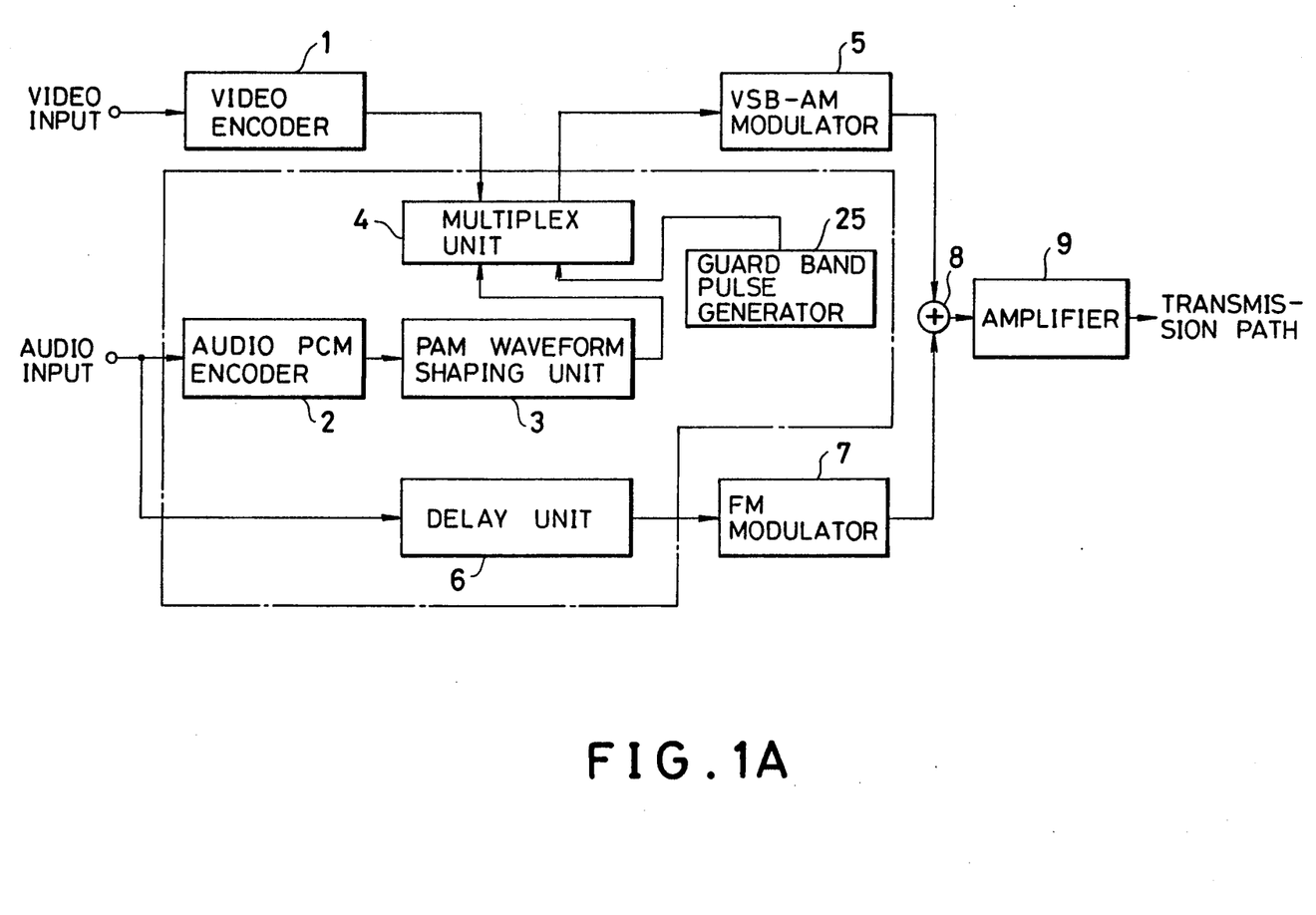
FIGS. 1A and 1B are views showing an entire system for transmitting and receiving television audio signals according to the present invention.
Figure 1B:
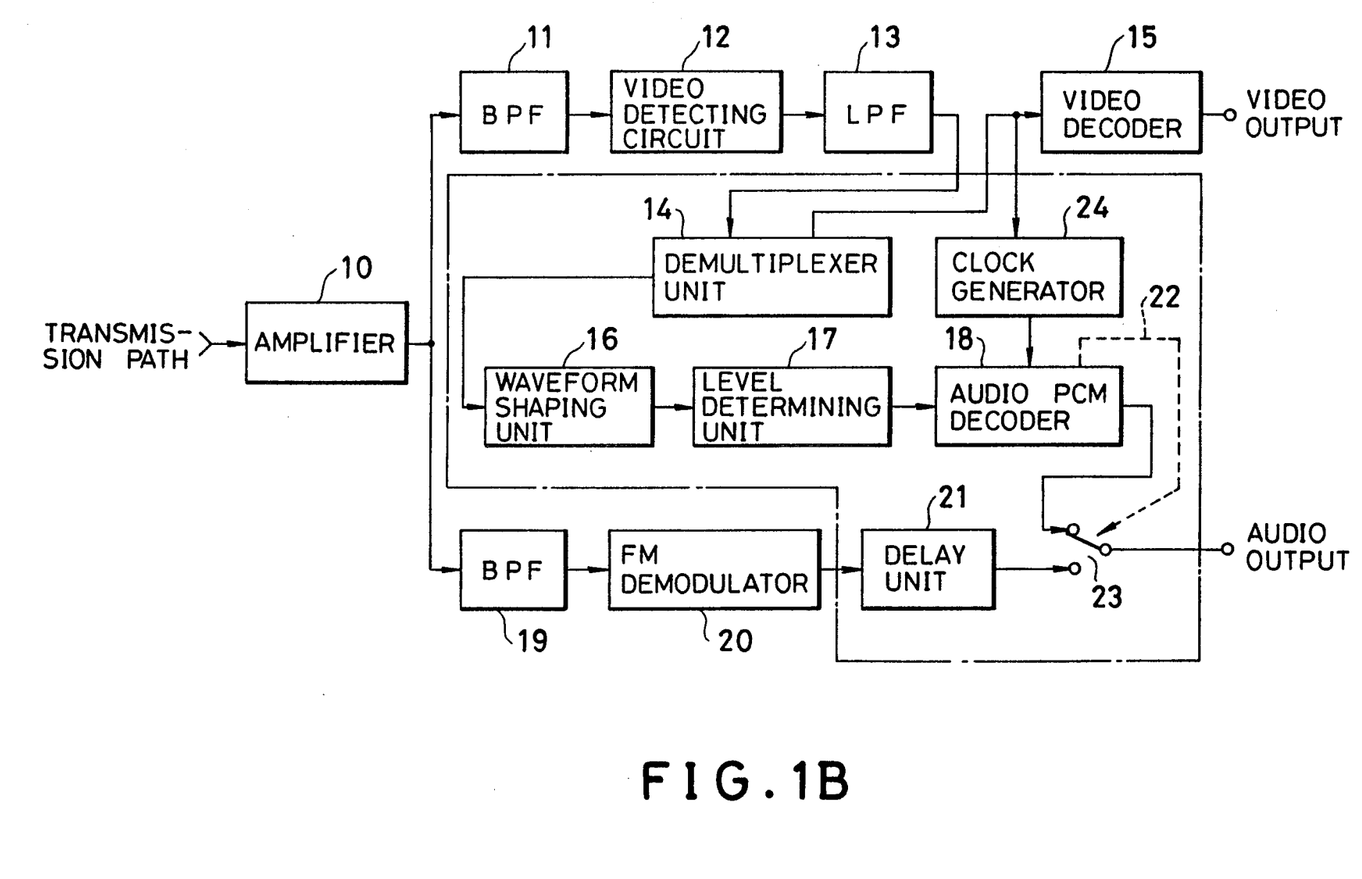

The system of the present invention as shown in FIGS. 1A and 1B has an ordinary arrangement for transmitting and receiving television signals such as that according to the standard NTSC television system except portions of the system at the receiving side and the transmitting side as indicated by dashed-and-dotted lines. Here, an audio signal is frequency modulated and transmitted over a transmission channel. At the receiving side, the FM audio signal is demodulated to be extracted. Consequently, such audio signals and video signals are compatible with a receiver of the standard NTSC system, and that is, are received and decoded back to the original signals. In FIGS. 1A and 1B, the portions as shown by dashed-and-dotted lines are additionally incorporated by the present invention. These portions will be explained below.

At the transmitting side, an input audio signal is inputted to an audio PCM encoder 2 in which the signal is PCM encoded and an error correction code is appended to such signal. The PCM signal is then passed to a PAM waveform shaping circuit 3. The encoded waveform shaped signal is then fed to a multiplex unit 4. A guard band pulse which is generated from a guard band pulse generator 25 is also fed to the multiplex unit 4 in which the PCM encoded signal which has been pulse amplitude modulated, and the guard band pulse are multiplexed into a scanning retrace interval of a video signal outputted from a video encoder 1.

At the receiving side, the signal multiplexed into the blanking interval of the video signal is demultiplexed by demultiplexer unit 14. The signal is then passed to a waveform shaping unit 16. The waveform shaped PCM audio signal is passed to a level determining unit 17. The signal is then fed to an audio PCM decoder 18 in which it is decoded back to the original audio signal. A clock signal is generated by a clock signal generator 24, for use by the audio PCM decoder 18 in the decoding of the PCM signal. A switch 23 is correspondingly operated in response to a bit error rate determination signal 22 derived from the decoder 18. When the bit error rate is low, the switch 23 is located as shown in FIG. 1B so that the PCM audio signal of enhanced high fidelity transmitted over a transmission channel is extracted.

Figure 2A:
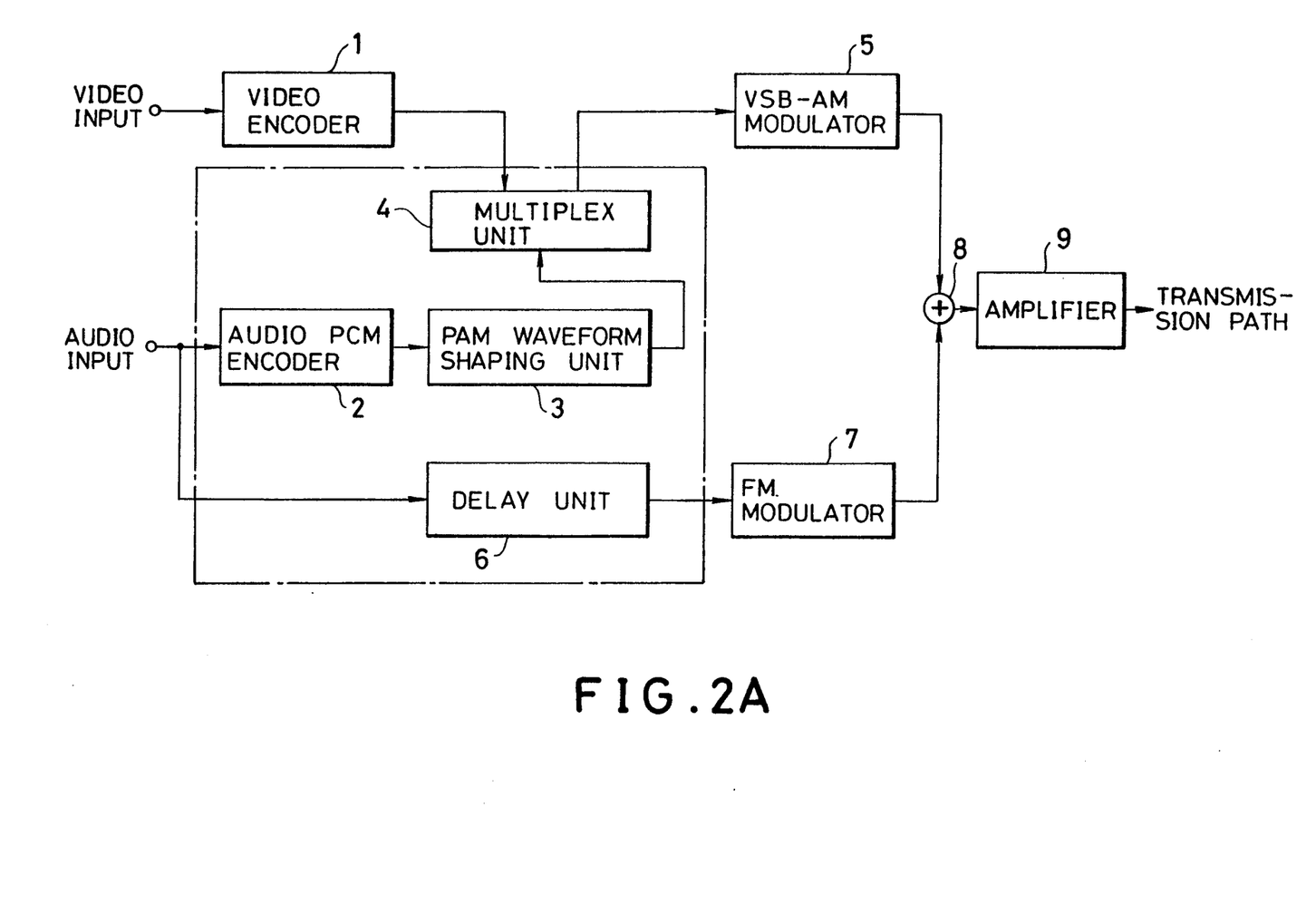
FIGS. 2A and 2B are block diagrams of one embodiment of Dual audio transmission system according to the first object of the present invention.
Figure 2B:
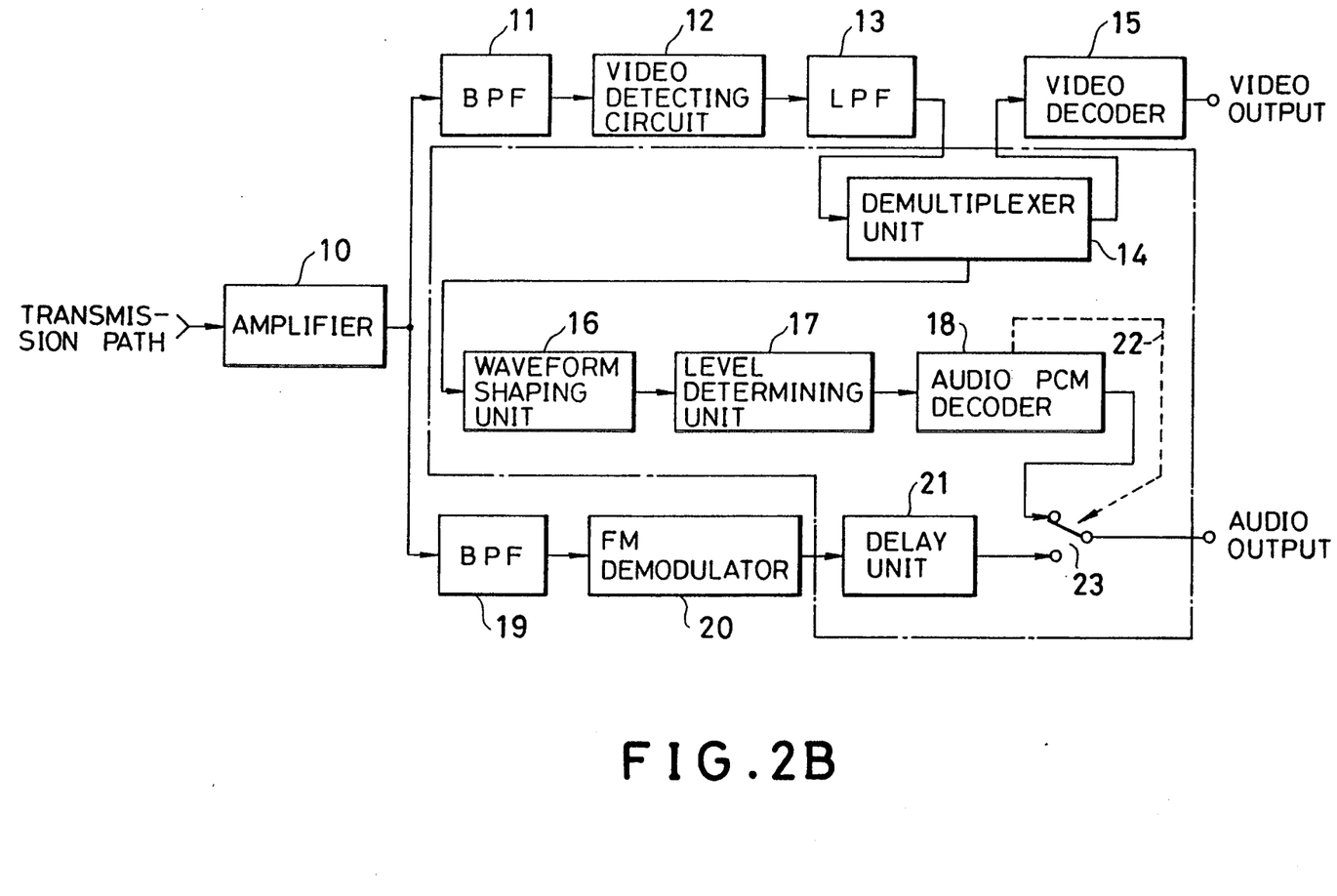

FIGS. 2A and 2B are block diagrams of one preferred embodiment according to first object of the present invention. An input video signal is provided to a video encoder 1, which for purposes of description is an NTSC encoder, but may be any other equivalent encoder, such as a Phase Alternate Line (PAL) or Sequential Color and Memory (SECAM) encoder. An audio signal is inputted to an audio PCM encoder 2 in which the signal is PCM encoded into a digital signal along with an error correcting code appended to such signal. Such an error correction code may be any one of presently known cyclic codes.

In the encoder of the present invention, continuous PCM signals are divided into groups so as to correspond with a timing of a respective one of scanning retrace intervals, considering multiplexing the signals into the following scanning retrace intervals of the television signals.

The PCM encoder signal then passes to a waveform shaping circuit 3 in which the signal is waveform shaped and pulse amplitude modulated (PAM). The encoded and waveform shaped signal is then fed to a multiplex unit 4 in which it is multiplexed in the horizontal and/or vertical blanking intervals of the encoded video signal outputted from the encoder 1. The multiplexed signal is inputted to a vestigial side band-amplitude modulation (VSB-AM) modulator 5 in which a video carrier is amplitude modulated by the encoded and multiplexed video signal. As used herein, the terms "pulse code modulation" and its abbreviated form "PCM" are intended to include all forms of pulse modulation in which discrete samples of a signal are used to vary a parameter of a pulse waveform. For example, one may vary the amplitude, width or position of the pulse waveform in proportion to the sampled signal. Further, the sampled signal may be composed of an analog signal which is sent at discrete times (but allowed to vary continuously over all values), or it may be quantized into a number of discrete levels. While quantization of the sampled signal and pulse amplitude modulation are preferred in the practice of the present invention, the terms "pulse code modulation" and "PCM" are intended to include all forms of pulse modulation as described above.

The input audio signal is also passed to a delay circuit 6 in which the input audio signal is delayed by a predetermined delay time equal to the time required for PCM encoding, wave shaping, multiplexing, etc. in order to maintain synchronization of the audio signals, and is then inputted to an FM modulator 7 in which the audio signal is frequency modulated. The FM audio signal is combined with the modulated video signal in an adder 8, and the resulting signal is amplified by an amplifier 9 and is subsequently transmitted over a transmission medium.

At the receiving side, the received signal is amplified by an amplifier 10 and is then passed to band pass filters 11 and 19. Band pass filter 11 passes the modulated video signal (which includes the time division multiplexed PCM audio signal) to a video detecting circuit 12 which demodulates the video signal and passes the demodulated signal to a low pass filter 13, through which the multiplexed baseband video signal is filtered out. The baseband signal is then inputted into a demultiplexer unit 14 which extracts the PCM audio signal that is multiplexed in the video signal blanking interval, and which is then fed to a waveform shaping unit 16 to be waveform shaped. The remaining video signal is passed from demultiplexer unit 14 to video decoder circuit 15 which converts the NTSC signal to an R,G,B video output signal. The waveform shaped PCM audio signal is passed to a level determining unit 17 which detects the amplitude level of the signal and converts the level to a PCM digital signal. The PCM digital signal is then inputted to an audio PCM decoder 18 in which it is decoded back to the original audio signal.

The received signal is also inputted to a band pass filter 19 which functions to pass the frequency modulated audio signal to an FM demodulator 20 in which the FM signal is demodulated back to the original audio signal. The audio signal is then delayed by a delay unit 21 which adjusts for the time delay required to decode the PCM audio signal.

The PCM decoder circuit 18 decodes the PCM encoded signal in accordance with the appended error correcting code to correct decoding errors. Decoder 18 keeps count of the number of errors to be corrected and compares the error rate with a predetermined threshold. If the error rate is above the threshold, the decoder 18 outputs a switching signal 22 which switches a switch 23 over to the FM audio signal source which is then outputted at an audio output terminal. If the bit error rate is less than or equal to the threshold, a signal 22 is outputted which causes switch 23 to switch back over to the PCM audio signal source to be outputted at the audio output terminal. Switch 23 is shown schematically in order to better illustrate its function and is preferably a high speed solid state switch.

The present invention uses an error correction code as mentioned above and means for detecting an error utilizing the error correction code which are taught by techniques generally used for transmitting PCM signals and appending codes thereto. For example, U.S. Pat. No. 4,809,118 shows the structure of such code for correcting an error in FIG. 17 and an error corrector/detector using such code in FIG. 11. Further, those systems which show an error correction code and means for detecting an error include U.S. Pat. No. 4,630,271, which describes and illustrates in FIG. 12, that signals are extracted according to an error rate along a line denoted by reference numeral 425 to be used for controlling an error correction.

Figure 3:
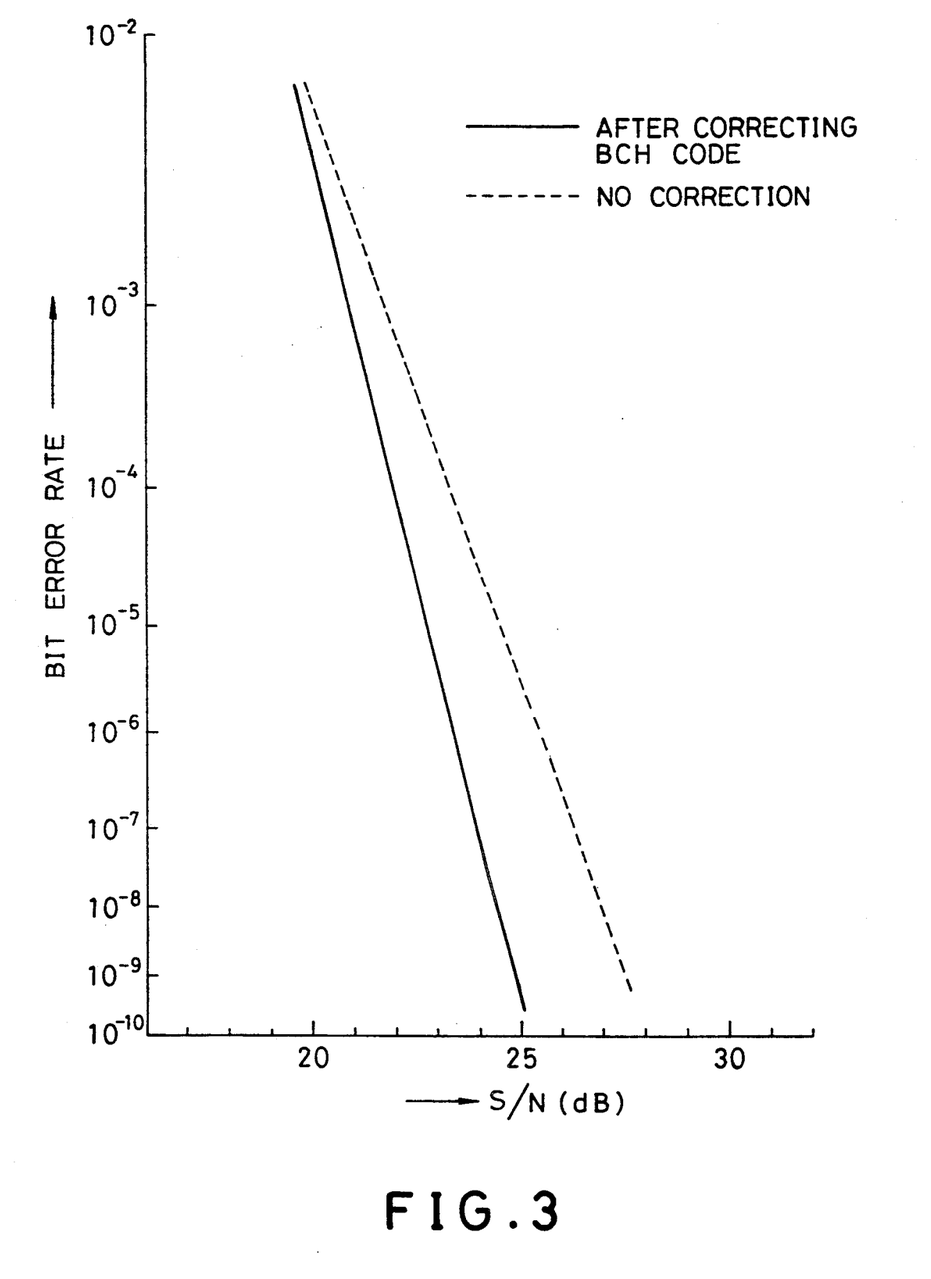
FIG. 3 is a graph illustrating the relationship between signal-to-noise ratio and bit error rate in a PCM audio signal.

A typical relationship between bit error rate and signal-to-noise ratio is shown in the graph of FIG. 3 in which the solid line represents signal-to-noise ratio after error correction, while the dashed line represents the signal-to-noise ratio relationship without error correction. The switching threshold for activating switch 23 by the switching signal 22 is selected based on this relationship in conjunction with the comparable signal-to-noise ratio of the FM audio signal. Thus, if the bit error rate of the PCM audio signal exceeds the selected threshold level, which typically can occur at low signal-to-noise ratios as illustrated in FIG. 3, the switch 23 is activated to connect to the FM audio signal for so long as the bit error rate of the PCM audio signal remains above the selected level. As soon as the bit error rate of the PCM audio signal again falls below the selected threshold level, the switch 23 is activated to switch back to the PCM audio signal. Thus, the higher quality signal is always selected based on the bit error rate of the PCM audio signal. The above technique can be applied to the high definition television system proposed by the same assignee.

The following paragraph relates to a guard band pulse which is derived from a guard band pulse generator 25 and superimposed immediately before the leading edge of a synchronizing television signal as described in the foregoing paragraph relating to the second object of the present invention.

Figure 7:
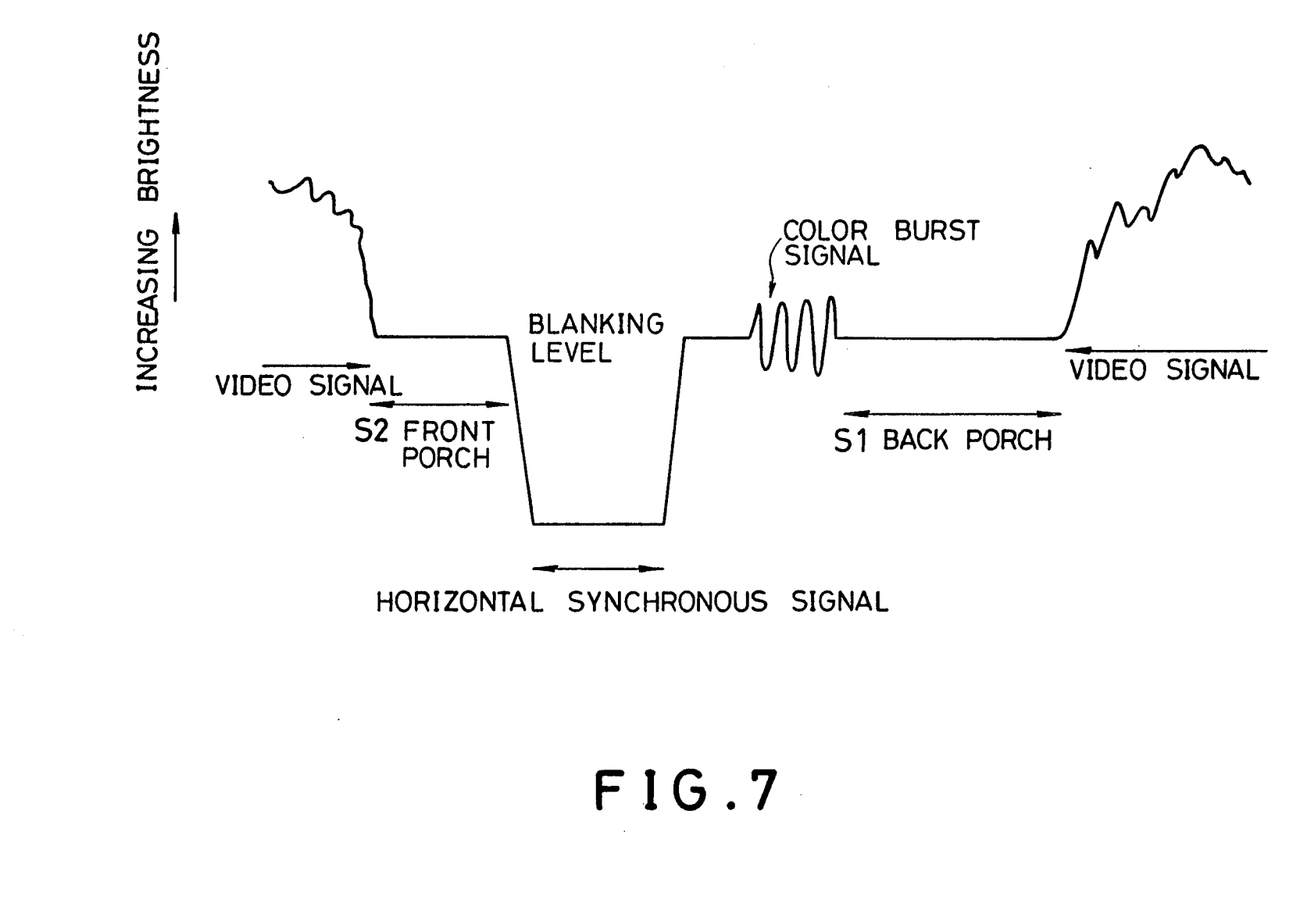
FIG. 7 is a graph illustrating the configuration of a typical video signal in the NTSC format.

FIG. 7 illustrates the waveform of a composite video signal of the NTSC format. The PCM encoded audio signal obtained by the present invention is time multiplexed into the composite video signal during horizontal and/or vertical blanking intervals.

An example of a PCM audio signal transmitted over a transmission channel is specified below:

An audio channel number is set to two since there is a possibility of the installation of a stereo or the like. A sampling frequency is set to 32 KHz, a bit number is set to 8 where a 15-bit signal is quasiinstantaneously compressed by a differential PCM. Then, a code transmission rate is 512 Kbps. When other codes including error correcting, synchronizing, controlling codes or the like are appended, the code transmission rate is about 585 Kbps. Since at this code transmission rate, it is difficult to multiplex a PCM audio signal into a scanning retrace interval of a video signal, two values (1,0) are converted into three values (1,0.−1) to perform the multiplexing. Then, the code transmission rate is reduced to about 390 Kbps. When scanning lines of television signals into which the signals are multiplexed are 500 per frame, the number of multiplexed signals per one scanning line is 26.

As shown in FIG. 7, the so-called back porch S1 of the composite video signal is of comparatively long duration. However, the effective time period which can be used for time multiplexing is limited since a color burst signal appearing in this interval is needed by the receiver for color subcarrier regeneration, as is generally known in the art. Thus, the so-called front porch S2 of the video signal is preferably utilized in the time multiplexing operation in order to provide the PCM audio signal. The time period of the front porch S2 is, however, very restricted in length.

For the reason stated above, there is a need to contrive an arrangement which allows the number of the signals as mentioned above to be divided into two parts so that one part of the signals are multiplexed into the back porch S1 and the other part into the front porch S2. In particular, the front porch S2 has a narrow time width and additionally, is immediately followed by a reference edge portion of a horizontal waveform. Hence, due to this it is necessary to find a solution to perform multiplexing.

Figure 5:
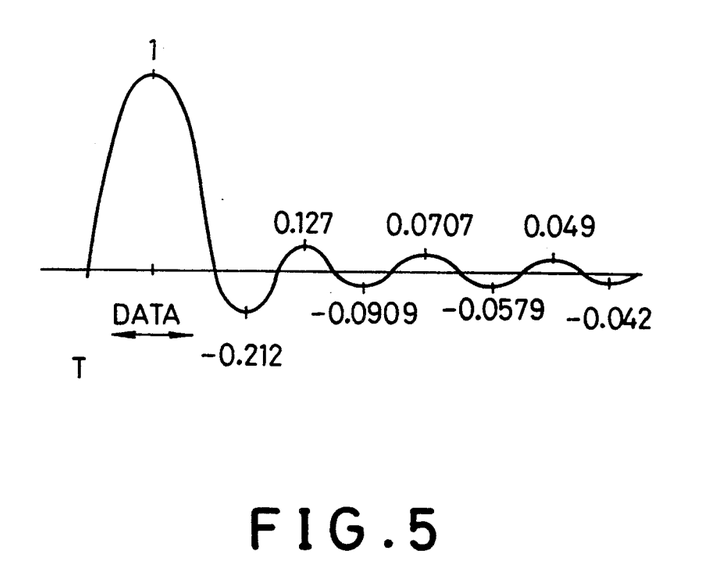
FIG. 5 is a graph showing the waveform of a filtered PCM data pulse.
Figure 8:
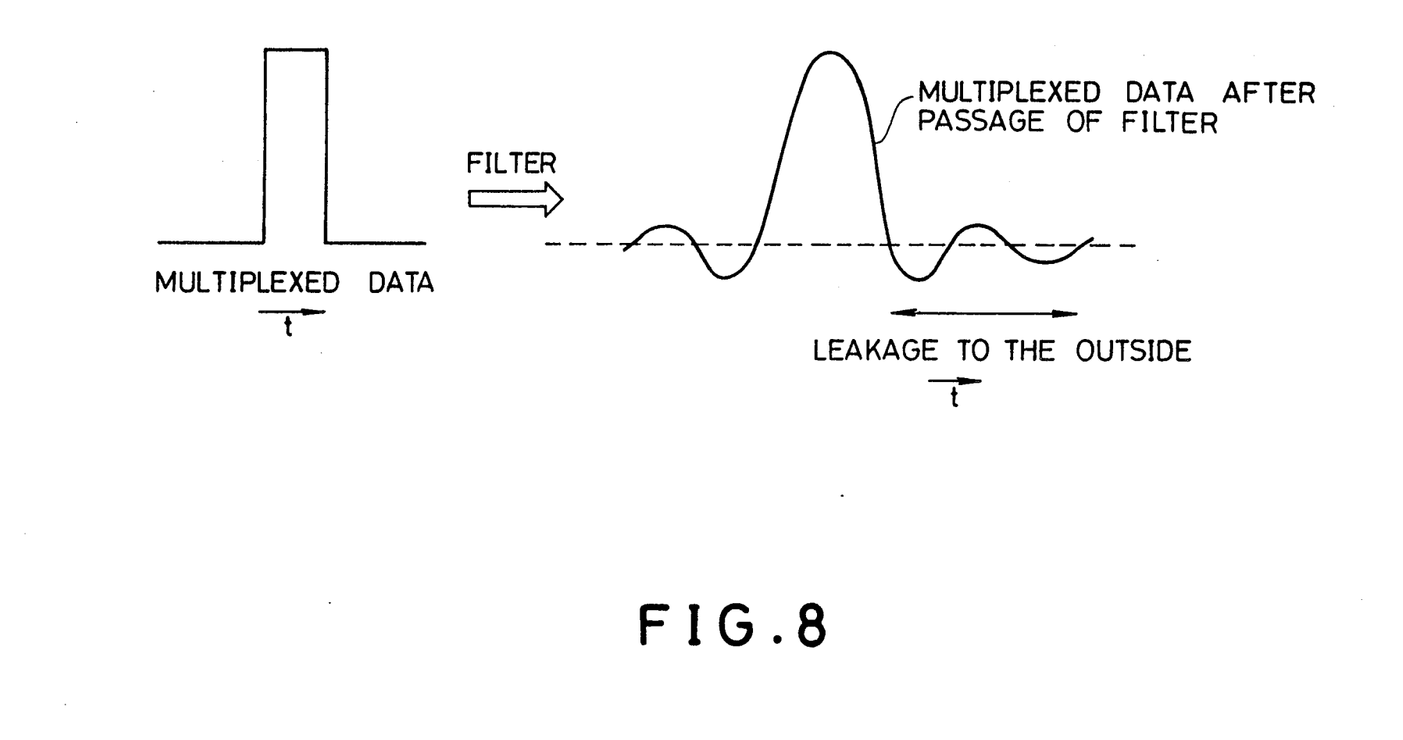
FIG. 8 is a chart illustrating the band limiting effects of low pass filtering a multiplexed data pulse.
Figure 9:
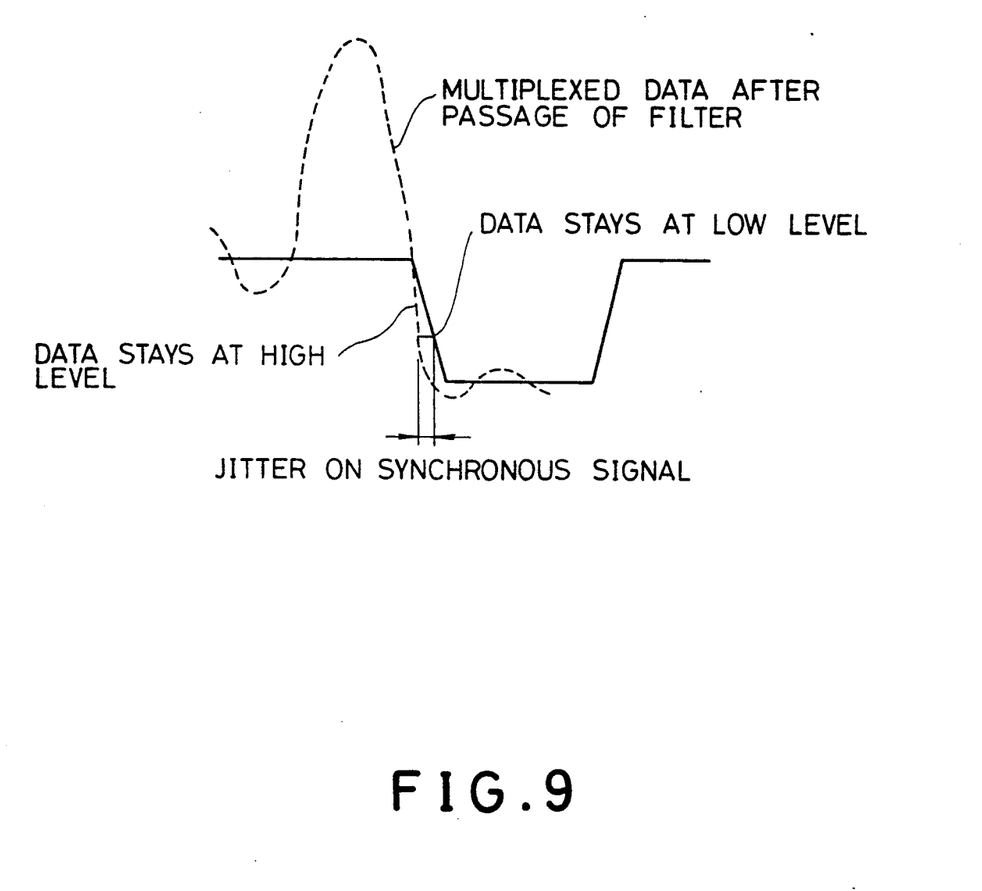
FIG. 9 is a chart illustrating the band limiting effect of a multiplexed data pulse on a synchronizing signal.

FIG. 8 illustrates a multiplexed data pulse and the multiplexed data after passage through a low pass filter. As can be seen, the data pulse after being low pass filtered contains time components which extend outside the area of the original pulse. If this pulse is multiplexed on the front porch S2, the problem of jitter on the horizontal synchronizing signal occurs, as shown in FIG. 9. FIG. 9 illustrates the jitter encountered on the synchronizing signal in the event that the data is at a high level or at a low level, respectively. FIG. 5 illustrates the frequency characteristic of a band limited data pulse by a low pass filter, which is denoted as (sin X)/X. As is evident, the amplitude of such a characteristic rapidly decreases. For example, assuming that the pulse width of the data pulse is T, the amplitude decreases to 0.127 after 2.5T, and to −0.042 after 7.5T. Thus, the amplitude at 7.5T decreases to approximately ⅓ of the amplitude at 2.5T.

Figure 4:
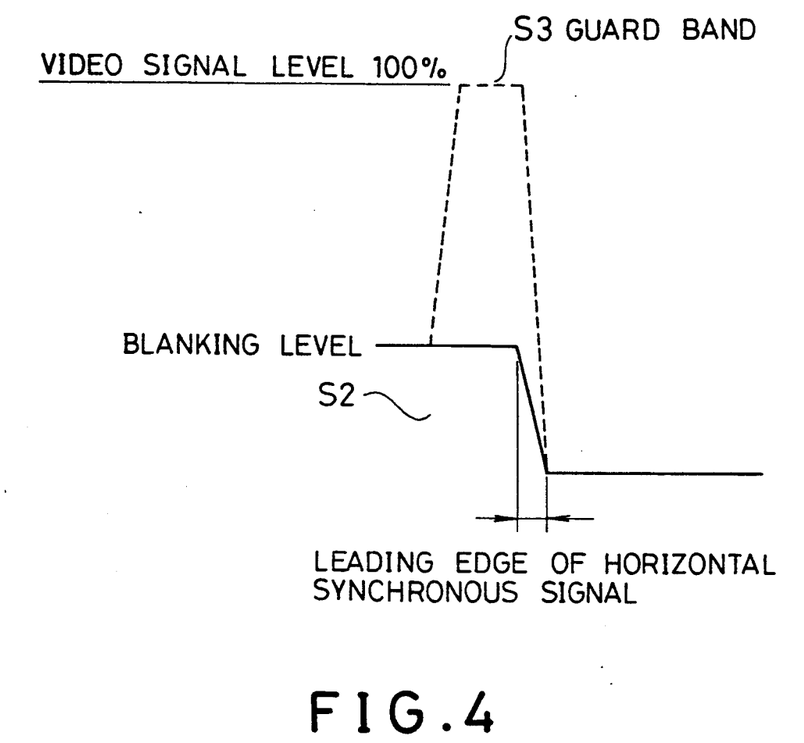
FIG. 4 is a graph illustrating the insertion of a guard band into a video signal before a horizontal synchronizing signal according to the second object of the invention which used in the encoder of FIGS. 1A and 1B.

As such, in one preferred embodiment of the invention, a guard band signal S3 is superimposed on the video signal immediately prior to the leading edge of the horizontal synchronizing signal as shown in FIG. 4. This can be accomplished by the multiplex unit 4 and guard band signal generator 24 of FIG. 1A. Superimposing the guard band signal 12 increases the inclination of the leading edge of the horizontal synchronizing signal for detecting the synchronizing timing, by approximately three times. As a result, about the same synchronizing detection accuracy can be obtained even if interference signals of about three times amplitude interfere the signal, thus increasing the degree of freedom for superimposing the data pulse.

Figure 6A:
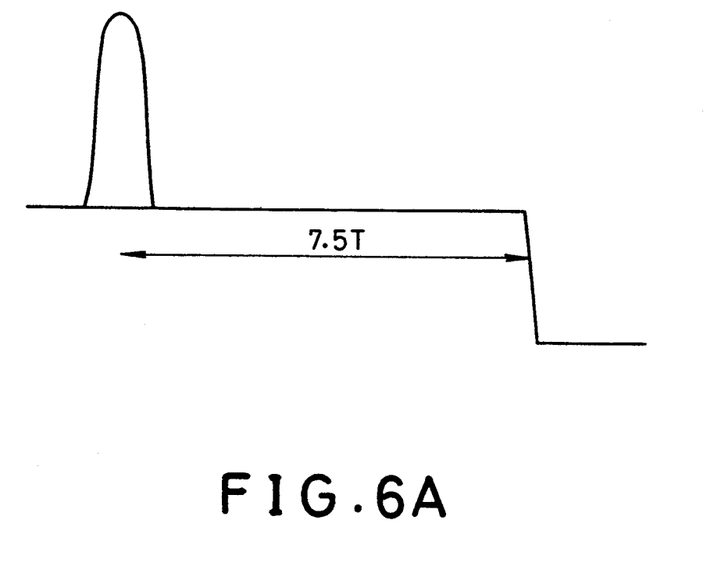
FIGS. 6A and 6B are graphs illustrating the positioning of a PCM data pulse in relation to a video synchronizing pulse, without and with a guard band, respectively.
Figure 6B:
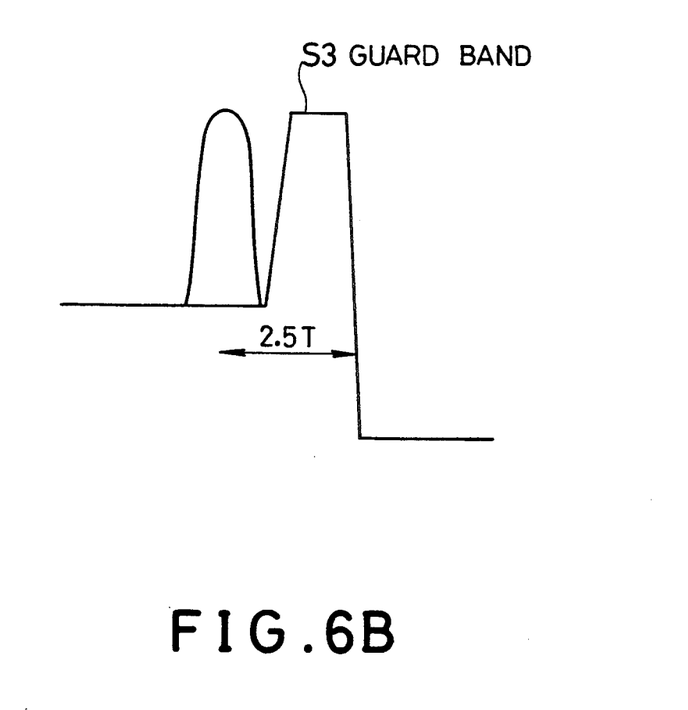

FIGS. 6A and 6B illustrate the improvement realized by the superposition of such a guard band. As shown in FIG. 6(A) without a guard band, the data pulse must be positioned away from the leading edge of the horizontal sync signal by 7.5 T (T=data width) in order to eliminate jitter in the synchronizing signal, when the allowable interference signal level is 0.042 as shown in FIG. 5. However, with the use of a guard band as shown in FIG. 6B, the data pulse can be spaced 2.5 T away from the horizontal synchronizing signal because the interference signal level can be allowed up to 0.127 as shown in FIG. 5. Hence, the guard band enables five more bits of data per scan line, resulting in 75 kilobits per second more data as opposed to PCM multiplexing without the guard band.

The following paragraph relates to a structure of a clock signal generator 24 as shown in FIG. 1B and operations thereof. A synchronizing television signal is inputted to the clock signal generator 24 as a reference signal. Effects of the multiplexing of a PCM audio signal on the reference leading edge portion of the synchronizing signal waveform are reduced and stabilized. Further, the clock signal generator 24 generates more accurate and stable clock signal with respect to a frequency and a phase of the original synchronizing signal so that the PCM audio signal can be accurately decoded back to the original audio signal.

Figure 10:
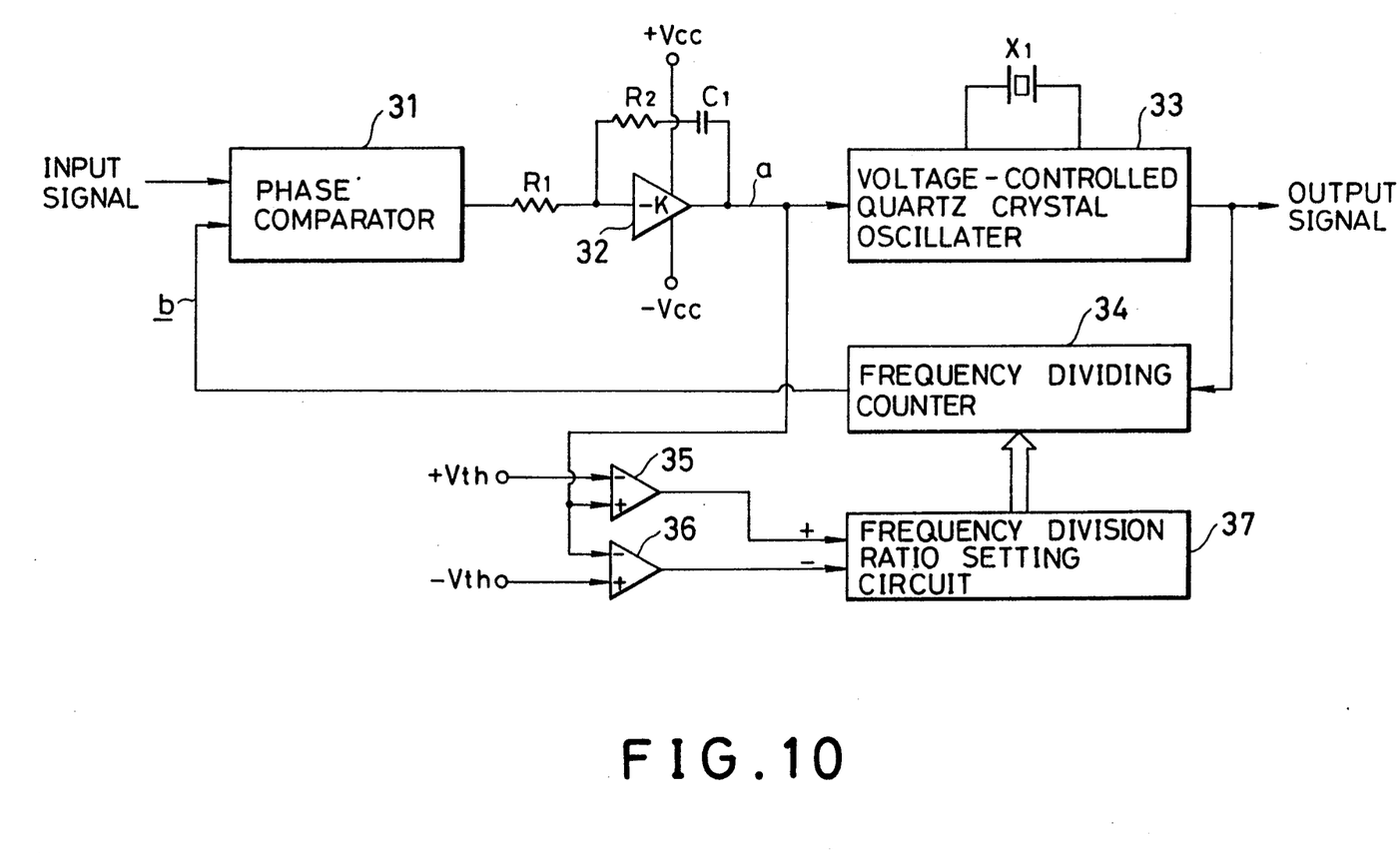
FIG. 10 is a block diagram of a phase locking circuit used in the receiver of FIGS. 1A and 1B according to the third object of the invention.

FIG. 10 is a block diagram of a phase locking circuit which provides a clock signal for decoding of the PCM encoded audio signal by the decoder 18 in FIG. 1B. Such a phase locking circuit may be incorporated in the demultiplexer unit 14 in FIG. 1B. In the present embodiment, the vertical synchronizing signals of the composite video signal are used in order to provide a synchronized clock for the decoding of the PCM audio. The 59.94 Hz vertical synchronizing signal is inputted to one input terminal of a phase comparator 31 and is compared with the phase of a signal b. The signal b is generated by frequency divider 34 which divides the frequency of the clock output of a voltage controlled quartz crystal oscillator (VCO) 33 by a selected ratio. The output of phase comparator 31 is proportional to the difference in phase between the signal b and the input synchronizing signal. If the phase of signal b lags behind the input signal, phase comparator 31 will output a negative voltage signal; conversely, when the phase of signal b leads the phase of the input signal, phase comparator 1 will output a positive voltage signal. The output of phase comparator 31 is integrated by a loop filter integrator consisting of inverting amplifier 32, having a gain of -K, and resistors R1, R2 and capacitor C1. Inverting amplifier 32 is supplied with a power supply ranging between $+V_{cc}$ and $-V_{cc}$. The integrated voltage output signal a thus varies between $+V_{cc}$ and $-V_{cc}$. The integrated voltage signal a is then applied to the voltage controlled oscillator 33 to vary the frequency of the clock signal output therefrom.

Figure 12:
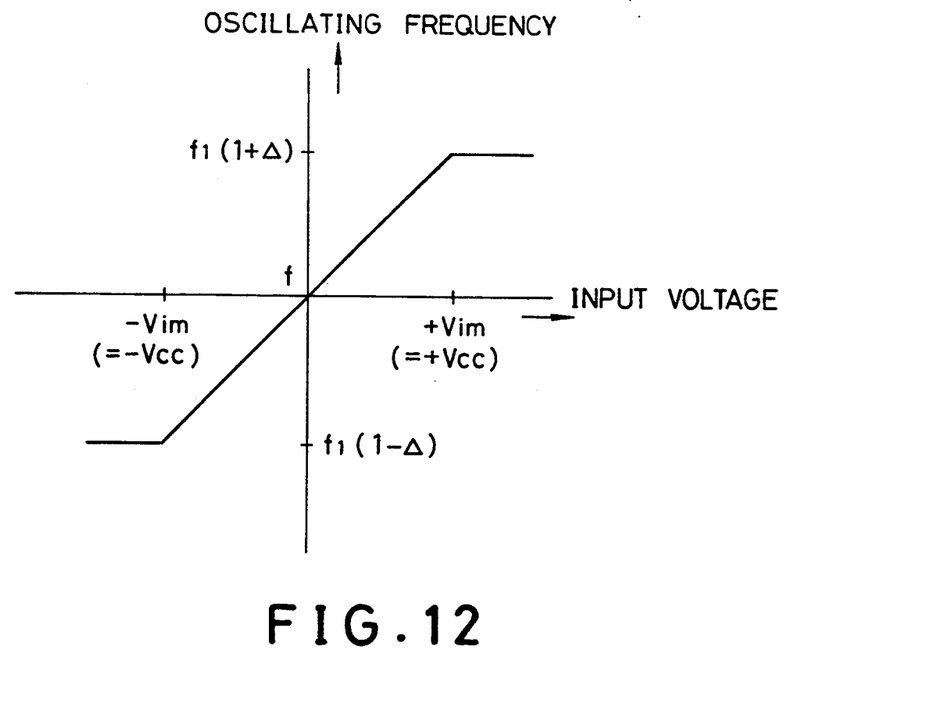
FIG. 12 is a graph illustrating the characteristic curve of input voltage versus oscillating frequency of the oscillator of FIG. 10.

FIG. 12 is a graph illustrating the characteristic curve of the VCO 33. As illustrated, the frequency of the VCO 33 varies from $f_1(1-\Delta)$ to $f_1(1+\Delta)$, wherein $f_1=4.8$ MHz is assumed, and $\Delta=3\times10^{-5}$. When signal 1 is at $-V_{cc}$ or less, the frequency of VCO 33 will be locked at $f_1(1-\Delta)$ and when the signal a is at $+V_{cc}$ or greater, the frequency of VCO33 will be locked at $f_1(1+\Delta)$. When the signal a varies between $-V_{cc}$ and $+V_{cc}$, the frequency of VCO33 varies linearly with the signal a. The output of VCO 33 is fed to frequency divider 34 which divides the frequency of the clock signal down to an appropriate frequency which can be handled by phase comparator 31. In the stable state, the divided frequency ratio is denoted by $N=4.8\times10^6/59.94=1001\times80$.

The integrated voltage signal a is also applied to a pair of voltage comparators 35 and 36. The inverting terminal of comparator 35 is supplied with a reference voltage $+V_{th}$ and the non-inverting terminal of comparator 35 is supplied with signal a, while the inverting terminal of comparator 36 is provided with signal a and the non-inverting terminal of comparator 36 is provided with reference voltage $-V_{th}$. Comparator 36 provides an H level output if the voltage of signal a is above the reference voltage $+V_{th}$, and provides an L level signal if the voltage of signal a is below the reference $+V_{cc}$. Conversely, comparator 36 provides an H level output signal if the voltage of signal a is below $-V_{th}$ and provides an L level output signal if the voltage of signal a is above voltage $-V_{th}$. The voltages $+V_{cc}$ and $-V_{cc}$ are slightly smaller than the corresponding voltages $+V_{th}$ and $-V_{th}$, respectively. The output of comparator 35 is inputted to the + input terminal of frequency ratio setting circuit 37 and the output of comparator 36 is supplied to the negative (−) input terminal thereof.

Frequency ratio setting circuit 37 provides ratios of N, N+, and N− to the frequency divider 34 when both inputs are at L level, when the "+" input is at the H level, and when the "−" input is at the H level, respectively, wherein:

$$N=1001\times80$$
$$N=1001\times79$$
$$N=1001\times81$$

Thus, the frequency ratio of N is supplied to the frequency divider 34 when the voltage a is between the range of $+V_{th}$ and $-V_{th}$, N+ when the voltage of signal a is above $+V_{th}$, and N− when the voltage of signal a is below $-V_{th}$.

Figure 11:
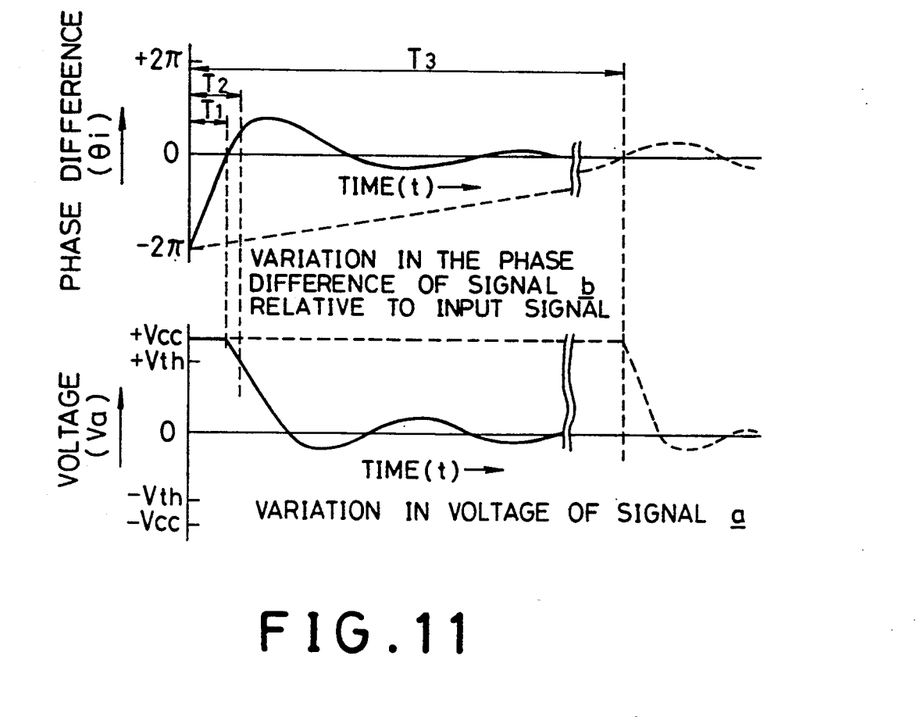
FIG. 11 is a chart illustrating the variation of phase difference and voltage with time of the circuit of FIG. 10, and in comparison to a conventional phase locked loop circuit.

FIG. 11 illustrates the operation of the circuit of FIG. 10 in solid lines and also illustrates the operation of a conventional phase locked loop in dashed lines. Time period T3 corresponds to the time period during which the phase difference varies from $-2\pi$ to 0, or one cycle slip time. During this period, the conventional phase comparator continues to produce a negative voltage output which causes the integrated voltage to remain saturated at $+V_{cc}$. At $t=T_3$, the output voltage of phase comparator crosses zero and switches to positive polarity, causing the integrator voltage $V_2$ to begin to decrease. At this point, the phase difference $\theta_i$ and voltage $V_2$ will experience damped oscillations until eventually becoming stabilized. The cycle slip time $T_3$ is determined by the values of $f_0$ and $\Delta$ of the input signal. In particular, $T_3=1/\Delta f_0$ which, for $f_0=59.94$ Hz and $\Delta=3\times10^{-5}$, is 555 seconds. This means that the acquisition time for the phase locked loop would take at least 555 seconds, which is impractical for use in a receiver.

The circuit of FIG. 10 has a frequency ratio set to N+ during the time period $T_2$ when the voltage of signal a drops to $+V_{th}$. As a result, the phase difference $\theta_i$ crosses zero at time $t=T_1=79/59.94=1.3$ seconds. It is clear that $T_1$ is a remarkable improvement over $T_3$ for the conventional phase locked loop. The phase locking circuit of the present invention thus exhibits a considerable reduction in acquisition time for the phase to be locked-in to the synchronizing input signal than the conventional phase locked loop.

The invention has been described in detail with respect to preferred embodiments, and it will now be apparent from the foregoing to those skilled in the art that changes an modifications may be made without departing from the invention in its broader aspects, and it is the invention, therefore, in the appended claims to cover all such changes and modifications as fall within the true spirit of the invention.

What is claimed is:

1. A method for transmitting and receiving television audio signals, comprising the steps of:
   pulse code modulation (PCM) encoding an input audio signal;
   frequency modulation (FM) encoding said input audio signal;
   time multiplexing said PCM encoded audio signal into a scanning retrace interval of a video signal;
   modulating a video carrier with said time multiplexed video signal;
   adding said FM encoded audio signal and said modulated video signal to form a combined signal;
   transmitting said combined signal over a transmission medium;
   receiving said combined signal;
   demodulating said time multiplexed video signal from said combined signal;
   demultiplexing said PCM encoded audio signal from said demodulated combined signal;
   decoding said demultiplexed PCM encoded audio signal;
   detecting a bit error rate in said PCM decoded signal;
   demodulating said FM encoded audio signal;
   switching an audio signal from said PCM decoded signal to said FM decoded signal when said detected bit error rate is above a predetermined threshold.

2. A method as claimed in claim 1, wherein said video signal is standard NTSC color television signal.

3. A method as claimed in claim 1, wherein said video signal is a high definition television signal which is compatible with standard NTSC color television signal.

4. A method as claimed in claim 1, wherein said scanning retrace interval is a vertical and/or horizontal retrace interval.

5. A method as claimed in claim 1, further comprising the steps of:
   delaying the FM encoding of said audio input signal by a predetermined time to synchronize said FM encoded audio signal with said PCM encoded audio signal; and
   delaying the demodulating of said FM encoded audio signal by a predetermined time to synchronize said FM decoded signal with said PCM decoded signal.

6. A method as claimed in claim 1, wherein said step of time multiplexing includes the steps of superimposing a guard band signal immediately before the leading edge of a synchronizing signal, and multiplexing said PCM encoded signal between said video signal and said guard band signal.

7. A method as claimed in claim 3, wherein said step of time multiplexing includes the steps of superimposing a guard band signal immediately before the leading edge of a horizontal synchronizing signal, and multiplexing said PCM encoded signal between a video signal and said guard band signal.

8. A system for transmitting television audio signals, comprising:
   means for pulse code modulation (PCM) encoding an input audio signal;
   means for frequency modulation (FM) encoding said input audio signal;
   means for delaying the FM encoding of said input audio signal by a predetermined time to synchronize said FM encoded signal with said PCM encoded signal;
   means for time multiplexing said PCM encoded audio signal into a scanning retrace interval of a video signal;
   means for modulating a video carrier with said multiplexed video signal; and
   means for combining said FM encoded signal and said modulated video signal to form a combined signal for transmission over a transmission medium.

9. A system as claimed in claim 8, wherein said scanning retrace interval is a horizontal and/or vertical retrace interval.

10. A system as claimed in claim 8, further comprising means for superimposing a guard band immediately before the leading edge of a synchronizing signal, said PCM encoded signal being time multiplexed between a video signal and said guard band.

11. A system for receiving a combined signal transmitted by using a method comprising the steps of pulse code modulation (PCM) encoding an input audio signal; frequency modulation (FM) encoding said input audio signal; time multiplexing said PCM encoded audio signal into a scanning retrace interval of a video signal; modulating a video carrier with said time multiplexed video signal; adding said FM encoded audio signal and said modulated video signal to form said combined signal; and transmitting said combined signal over a transmission medium; said system comprising:
   means for receiving said combined signal over said transmission medium;
   means for demodulating said time multiplexed video signal from said combined signal;
   means for time demultiplexing a pulse code modulation (PCM) encoded audio signal from said time multiplexed video signal;
   means for decoding a frequency modulation (FM) encoded audio signal in said combined signal; and
   means for decoding said demultiplexed PCM audio signal, including:
   means for detecting an error rate in the decoded PCM audio signal, and
   means for switching an output audio signal from said decoded PCM signal to said decoded FM signal when the detected error rate is above a predetermined threshold.

12. A system as claimed in claim 11, further comprising means for delaying said decoded FM signal by a predetermined time to synchronize said decoded FM signal with said decoded PCM signal.

13. A system as claimed in claim 11, wherein said scanning retrace interval is a horizontal and/or vertical retrace interval.

14. A system as claimed in claim 11, further comprising means for generating a clock signal in synchronism with said video signal, for use by said PCM decoding means in the decoding of said PCM encoded signal, including:
- voltage-controlled oscillator means for generating said clock signal,
- frequency dividing means for dividing the frequency of said clock signal by a selectable ratio,
- phase comparator means for comparing the phase of said frequency-divided clock signal with the phase of a synchronizing signal of said received video signal and developing a voltage signal proportional to the phase difference therebetween, and
- control means for controlling said frequency dividing means by the output of said phase comparator means.

15. A system as claimed in claim 14, wherein said control means comprises:
- integrator means for integrating said voltage signal from said phase comparator means and outputting an integrated voltage signal as an input to said voltage-controlled oscillator means,
- voltage comparator means for detecting whether said integrated voltage signal is above, below or within a predetermined range and outputting a signal corresponding thereto, and
- frequency ratio selecting means for providing a selected ratio signal to said frequency dividing means in response to the signal outputted by said voltage comparator means.

16. A system as claimed in claim 14, wherein said synchronizing signal is a vertical synchronizing signal.

* * * * *

UNITED STATES PATENT AND TRADEMARK OFFICE
CERTIFICATE OF CORRECTION

PATENT NO. : 5,072,297

DATED : December 10, 1991

INVENTOR(S) : Masaru Kanazawa et al.

It is certified that error appears in the above-identified patent and that said Letters Patent is hereby corrected as shown below:

Column 6, line 25, "(1,0.-1)" should be --(1,0,-1)--.

Column 8, line 12, "VCO33" should be --VCO 33--;
        line 14, "VCO33" should be --VCO 33--.

Column 9, line 21, "an" should be --and--;
        line 23, "invention" should be --intention--.

Signed and Sealed this

Third Day of August, 1993

Attest:

MICHAEL K. KIRK

Attesting Officer    Acting Commissioner of Patents and Trademarks